(12) United States Patent
Stark

(10) Patent No.: US 8,757,241 B2
(45) Date of Patent: Jun. 24, 2014

(54) FLEXIBLE PROTECTIVE COVER

(75) Inventor: Wolfgang Stark, Denkendorf (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/214,270

(22) Filed: Jun. 17, 2008

(65) Prior Publication Data

US 2009/0008048 A1 Jan. 8, 2009

(30) Foreign Application Priority Data

Jun. 18, 2007 (DE) .......................... 10 2007 029 290

(51) Int. Cl.
| | |
|---|---|
| *B60J 1/20* | (2006.01) |
| *B60J 3/00* | (2006.01) |
| *B60J 11/00* | (2006.01) |
| *A47G 5/02* | (2006.01) |
| *A47H 1/00* | (2006.01) |
| *A47H 3/00* | (2006.01) |
| *E06B 9/17* | (2006.01) |

(52) U.S. Cl.
USPC ..... 160/370.22; 160/238; 160/266; 296/97.8; 296/97.9

(58) Field of Classification Search
USPC ............... 160/266, 267.1, 268.1, 270, 370.22
See application file for complete search history.

(56) References Cited

U.S. PATENT DOCUMENTS

| | | | | |
|---|---|---|---|---|
| 4,649,981 | A * | 3/1987 | Bibeau | 160/120 |
| 4,934,437 | A * | 6/1990 | Kraeutler | 160/84.02 |
| 5,201,563 | A | 4/1993 | Liao | |
| 6,776,211 | B2 | 8/2004 | Schlecht et al. | |
| 6,966,591 | B2 * | 11/2005 | Schlecht | 296/37.16 |
| 2004/0040676 | A1 * | 3/2004 | Engl et al. | 160/370.22 |
| 2006/0021723 | A1 * | 2/2006 | Schneider et al. | 160/370.22 |
| 2007/0125500 | A1 | 6/2007 | Gosling et al. | |
| 2007/0281158 | A1 * | 12/2007 | Glew et al. | 428/375 |
| 2008/0197655 | A1 * | 8/2008 | Oerke et al. | 296/83 |
| 2008/0216971 | A1 * | 9/2008 | Rockelmann et al. | 160/271 |

FOREIGN PATENT DOCUMENTS

| | | |
|---|---|---|
| CN | 2908218 Y | 6/2007 |
| DE | 38 23 780 | 1/1990 |
| DE | 44 02 314 A1 | 8/1995 |
| DE | 10 2005 030 973 | 1/2007 |
| EP | 1 621 382 A1 | 2/2006 |
| NL | 9500121 A | 11/1995 |
| WO | WO 2007/003165 | 1/2007 |

OTHER PUBLICATIONS

Search Report from European Patent Office dated Sep. 24, 2009 (8 pages).
Office Action of China Patent Office dated Feb. 5, 2010.
English translation of an Office Action from the JPO for corresponding Japanese Patent Application No. 2008-159596 mailed on Sep. 18, 2012 (5 pages).
Search Report of European Patent Office issued in European Application No. EP 12 15 5401.8 with English translation of category of cited documents dated Jul. 19, 2013 (8 pages).

* cited by examiner

*Primary Examiner* — Katherine Mitchell
*Assistant Examiner* — Jeremy Ramsey
(74) *Attorney, Agent, or Firm* — Flynn, Thiel, Boutell & Tanis, P.C.

(57) ABSTRACT

A protective screen for a vehicle, in particular a sun screen for a vehicle roof is configured as a flexible planar structure for fastening in the region of the vehicle roof or of a trunk compartment.
The flexible planar structure has a first layer, which, at least in some sections, is of elastically stretchable configuration, and an overlying second layer, which is configured as a UV protective layer. Alternatively, the flexible planar structure has a main region having lower elasticity and/or air permeability, and secondary regions of a first type, having higher elasticity and/or air permeability than the main region.

23 Claims, 3 Drawing Sheets

FLEXIBLE PROTECTIVE COVER

FIELD OF APPLICATION AND PRIOR ART

The invention relates to a protective screen for a vehicle, in particular a sun screen for a vehicle roof, the protective screen being configured as a flexible planar structure and for fastening in the region of the vehicle roof or of a trunk compartment. The invention further relates to a protective screen system for a vehicle, in particular for a vehicle roof or a trunk compartment, having two guide devices running substantially parallelly in a pull-out direction, preferably in the vehicle longitudinal direction, and a protective screen guided on both sides on the guide devices and displaceable transversely to the pull-out direction, preferably in the vehicle longitudinal direction.

Protective screens configured as flexible planar structures are commonly known. Configured as sun screens, they are used, in particular, in the region of a vehicle roof in vehicles in which the vehicle roof, at least in some sections, is open or transparent in design. Such vehicles include, for example, vehicles with a large panoramic roof, vehicles with a Targa roof and vehicles with a sliding roof. Protective screens of the generic type which are configured as sun screens are here usually designed such that they are configured so as to be displaceable into a stowage state, in which they are slid fully or partially out of the region of the open vehicle roof, and a working state, in which they cover the vehicle roof. In the working state, protective screens of the generic type which are configured as sun screens reduce the sunlight shining in. Thus, in vehicles with a Targa roof, for example, an open-roofed driving experience is possible without the solar radiation reaching a disturbing level. Similarly, protective screens of the generic type are used in the region of a trunk compartment of a vehicle, in particular in station wagons. They here serve, in particular, as a visual protection, to prevent a view into the trunk compartment from outside.

The guidance of protective screens of the generic type is usually realized by the fact that the protective screens are held on both sides in the vehicle interior and are displaceable in the vehicle longitudinal direction. In the case of sun screens, they are usually held, for example, in the region of the vehicle roof and extend beyond the passenger region in the vehicle transverse direction. For this purpose, on protective screens, fastening means are provided, such as, for example, marginal sections, which are guided in guide devices.

It is regarded as a drawback of protective screens of the generic type that they are inclined to become stretched and expanded by external influences, such as heat and cold, as well as by the load imparted by the slip stream and other mechanical loads, so that, after a while, they sag down into the vehicle interior or the trunk in an unattractive manner and in a way which restricts the functionality.

In order to solve this problem, it has already been proposed to make the guide means to which the flexible planar structure is fastened elastically deflectable, at least on one side, so that the flexible planar structure is tensioned, in its entirety, in the vehicle transverse direction. The technical realization is expensive, however, and is not yet satisfactory with regard to the susceptibility to faults.

OBJECT AND ACHIEVEMENT

The object of the invention is therefore to refine a protective screen of the generic type and a protective screen system comprising such a protective screen, such that the drawbacks known from the prior art are eliminated or reduced.

The object is also achieved by the fact that the flexible planar structure is configured as a knitted fabric having at least one main region, preferably precisely one main region, having lower elasticity and/or air permeability, and at least one secondary region of a first type, preferably two secondary regions of a first type, having higher elasticity and/or air permeability than the main region.

Through the use of an elastic region, the disturbing influence of external influence factors such as great heat or mechanical load imparted by slip stream is able to be reduced. The planar structure is able, in part, to expand elastically and reverts to the original state once the specific external influences have dropped away, for example as soon as the slip stream abates.

By virtue of the design according to the invention, the advantageous elasticity can be obtained without the main region, which occupies by far the predominant part of the total area of the planar structure, having to be provided for this purpose from a special material. This allows the flexible planar structure, in the main region, to be produced from a material which, with regard to the sun protection and/or visual protection, has ideal characteristics, while only in the secondary regions of the first type is a material used and/or an embodiment of the knitted fabric used which are selected with regard to advantageous elasticity. In the case of a correspondingly configured sun screen in the roof region of a vehicle, the arrangement of the secondary regions of the first type and of the main region is here preferably construed such that the main region is disposed above the seat position of the vehicle occupants, while the at least one secondary region of the first type, in the form of a strip or a plurality of strips, laterally adjoins said main region or is provided in a fully concealed manner in the marginal region of the vehicle roof. Also of benefit is a varying air permeability in the main region and the secondary region(s). Thus, in the case of a sun screen for an open roof, an increased air permeability can serve to reduce the effect that, at high speeds, the sun screen is pushed into the vehicle or pulled out of the vehicle and thus assumes an elongated concave or convex form. Since an increased air permeability is generally also accompanied, however, by an increased light permeability and thus a lower sun protection effect, it is advantageous to provide this increased air permeability in the secondary regions, while the air permeability in the main region is kept low and enjoys a reduced priority compared with the good sun protection effect in the main region.

The configuration as a knitted fabric allows the planar structure to be designed as a unitary component, which does not have to be joined together only through the joining-together of various planar material lengths. The different regions of the knitted fabric are created, in the production of the knitted fabric, by a mutually differing stitch density or differences in the material used. They jointly form a particularly reliable and esthetically advantageous unitary planar structure.

Planar structures according to the invention have a width in the vehicle transverse direction which, in the case of a sun screen, roughly corresponds to the width of the opening to be covered. Thus, a sun screen for covering a sliding roof is usually between 0.6 m und 1.20 m wide, while a sun screen designed to cover a panoramic roof is, depending on the type of vehicle, up to 2 m wide or, indeed, wider. In the case of a trunk cover, the width can be chosen such that the planar structure can span the trunk. This is usually possible with a width of the flexible planar structure between 0.9 m and 2 m.

A preferred embodiment of the flexible planar structure having different regions provides that, in addition to the secondary regions of the first type, at least one secondary region of a second type, preferably two secondary regions of a second type, having reduced elasticity and/or air permeability relative to the secondary region of the first type, are provided. These secondary regions of the second type preferably conform, in terms of the material and knitted fabric characteristics, to the main region. The secondary regions of a second type allow flexible planar structures to be configured in the marginal regions from impermeable, load-bearing material which is well suited to fastening in the region of the vehicle roof or of a trunk compartment.

In one refinement of the invention, the at least one main region and the at least one secondary region of the first type, as well as preferably also the at least one secondary region of the second type, are configured as regions extending in a pull-out direction, preferably in the vehicle longitudinal direction, and are arranged side by side transversely to the pull-out direction, preferably in the vehicle transverse direction. The pull-out direction is here the direction in which the protective screen can be moved out of its stowage state into its working state. The most advantageous embodiment provides that the pull-out direction is the vehicle longitudinal direction. In a protective screen configured as a sun screen, the sun screen is preferably disposed, in a stowage state, in the rear region of the vehicle roof or behind the vehicle roof and can be pulled out forward for transfer into the working state. As a result of the design comprising main region and secondary regions, arranged side by side, with a sun screen it can be particularly advantageously ensured that the main region, in the working state and when transferred into the working state, is disposed above the places of the passengers.

In one refinement of the invention, the flexible planar structure has three regions, which, in the pull-out direction, preferably in the vehicle transverse direction, are arranged side by side, the two outer regions being secondary regions of the first type and the inner region being the main region. If the pull-out direction corresponds to the vehicle longitudinal direction, then the side regions are here provided on the left and right sides. The main region is provided midway between. When a protective screen of this kind is transferred from its stowage state into its working state, the secondary regions are thus always located on the left and right outer sides. In the case of a sun screen, the secondary regions of the first type are hence always located in the region of the vehicle pillars, so that sunlight which might possibly shine to an elevated extent through these secondary regions hits upon the passengers only in the event of an adverse radiation direction.

In an alternative hereto, the flexible planar structure has five regions, which are arranged side by side transversely to the pull-out direction, preferably in the vehicle transverse direction, the middle region being the main region, while the outer regions are secondary regions of the second type and the regions lying between the outer regions and the middle region are secondary regions of the first type. This embodiment allows the secondary regions of the second type, which form the outer margin of the flexible planar structure, to be used for the secure fastening to the vehicle, for example respectively introduced into guide rails. The secondary regions of the first type, lying inwardly adjacent to those of the second type, are responsible for the creation of the elasticity and/or air permeability. The predominant areal share of the planar structure is occupied by the main region, which is disposed between the secondary regions of the first type. This embodiment offers the advantages of the above-described embodiment having three regions and additionally offers an improved fastening facility for the flexible planar structure.

The flexible planar structure, or at least the elastic bottom layer of the planar structure of a protective screen according to the invention, is preferably configured as a knitted fabric or woven fabric. Preferably the at least one main region and the at least one secondary region of the first type are here produced from different yarn types or with different knitted fabric structure, in particular with different stitch density. The use of different yarn types allows a different elasticity of the main region compared with the secondary region(s) of the first type to be easily created. Thus, in the main region, a non-elastic yarn can be used, so that constant characteristics are obtained with regard to the solar protection and the air permeability in this region. In the secondary regions of the first type, another yarn, however, can be used, which, in particular, has elastic characteristics, so that the elasticity is achieved solely or predominantly by the secondary regions. With a different knitted fabric structure, even if the same yarn is used in the secondary region and in the main region, a different behavior can be obtained. In particular, the use of a knitted fabric structure with lower stitch density and thus larger loops in the secondary region of the first type can serve to create increased air permeability and increased elasticity. With regard to the elasticity, this is based on the fact that larger loops have increased deformability, the loss of a force application, produced, for example, by a heat-conditioned or cold-conditioned deformation of the main region, causing the loops of the secondary region of the first type to revert to their unstretched form.

It is particularly advantageous if the flexible planar structure, at least in the secondary region of the first type, is made from UV radiation-resistant yarn or is provided with a UV radiation-repellant coating. Such an embodiment prevents the elastic region from losing its elastic characteristics as a result of perpetual solar radiation.

Also covered by the invention is a protective screen system for a vehicle, in particular for a vehicle roof or a trunk compartment, having two guide devices running substantially parallelly in a pull-out direction, preferably a vehicle longitudinal direction, and a protective screen guided on both sides on the guide devices and displaceable in the pull-out direction, preferably in the vehicle longitudinal direction, the protective screen being configured according to the above-described type.

In this context, it is particularly preferable that in the region of the guide devices, above and/or below the flexible planar structure, rigid cover sections are provided, which, at least in a working state of the sun screen system, extend over or under the planar structure. Cover sections of this type allow the use of a protective screen having a main region and secondary regions, in the case of a sun screen the cover surfaces serving to prevent sunlight from making its way through the secondary regions, in particular the secondary regions of the first type, through into the region of the passengers. It thereby becomes possible in the secondary regions, in particular the secondary regions of the first type, to configure the flexible planar structure such that it is optimized with regard to its air permeability and elasticity, without necessarily having to take into account of the advantageousness of these secondary regions with regard to the protective effect against solar radiation. Thus, in the secondary regions of the first type, wide-meshed textile material, in particular, can be used, which, as a result of its wide-meshed quality, offers high air permeability and the desired elasticity. It is particularly advantageous for this purpose if the cover surfaces, at least in the working state, extend over the secondary regions of the flexible planar structure and leave the main region at least substantially uncovered.

An advantageous embodiment of the protective screen system provides that a roller blind shaft extending transversely to the pull-out direction, in particular in the vehicle transverse direction, is provided, for receiving the protective screen in a partial or full stowage state. A particularly space-saving stowage state is thereby achieved, so that, for example, a protective screen configured as a sun screen does not lead disturbingly, in its stowage position, to an unwelcome shading of the vehicle interior or obstruct the view through the rear window.

BRIEF DESCRIPTION OF THE DRAWINGS

Further advantages and features of the invention emerge from the claims and the following description of preferred illustrative embodiments of the invention, which are represented with reference to the drawings, wherein:

DETAILED DESCRIPTION OF THE ILLUSTRATIVE EMBODIMENTS

Figure 1:
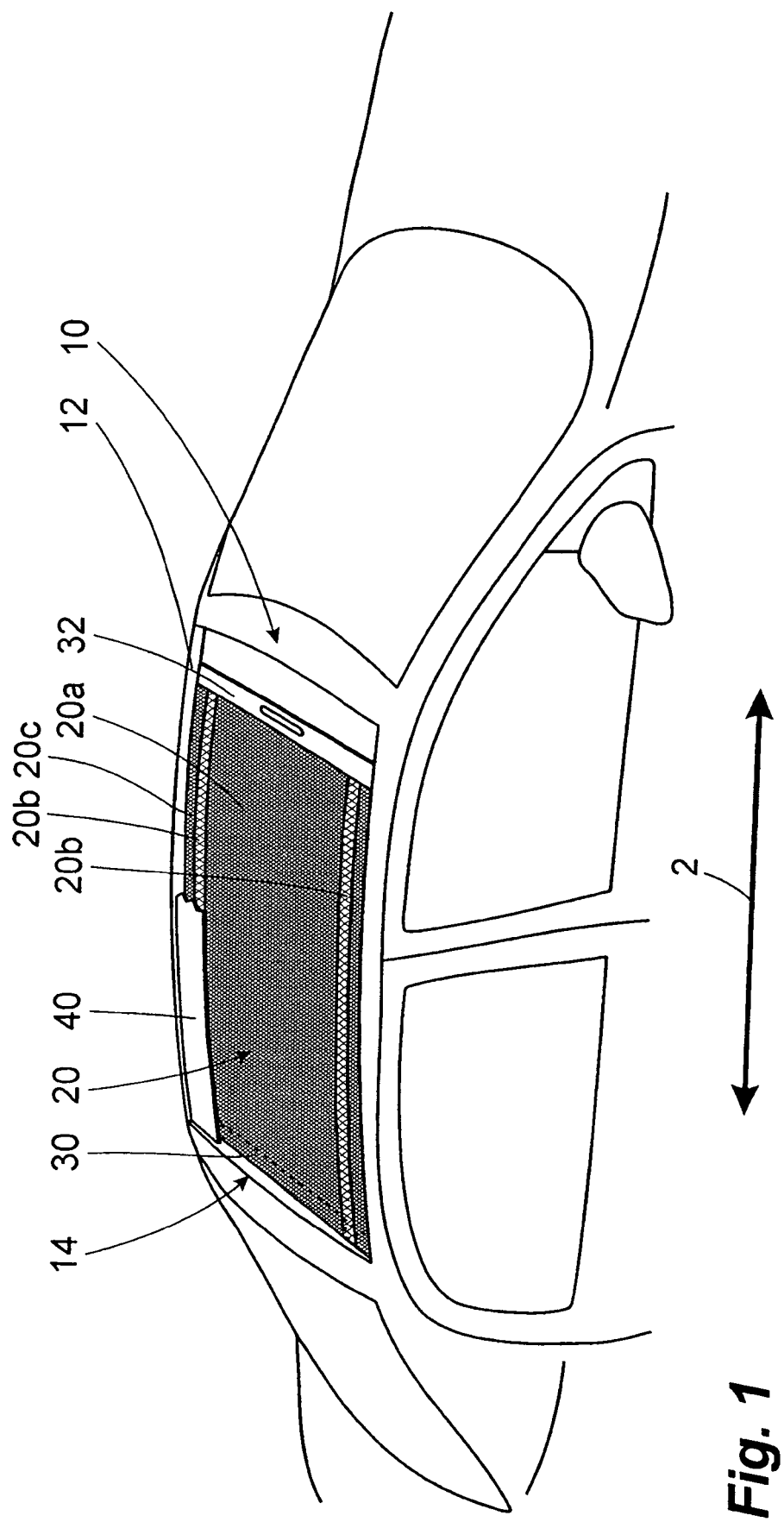
FIG. 1 shows a roof region of a vehicle having a sun screen system according to the invention.

FIG. 1 shows a sun screen system according to the invention in its prescribed installation situation. The sun screen system 14 is provided in the roof region of a vehicle. The roof 10 of this vehicle has a panoramic opening 12 occupying approximately the full length and the full width of the roof 10. This panoramic opening 12 is covered, in a manner not represented in detail, by a transparent glass screen, which ends flush with the exterior bodywork in the roof region. In the panoramic opening 12, a sun screen 20 is arranged, which is provided as a flexible planar structure 20 having five mutually separated regions 20a, 20b, 20c. A middle main region 20a here occupies about 70% of the total area. This main region 20a is adjoined, arranged laterally on both sides in relation to the vehicle longitudinal direction 2, by respective secondary regions 20b of the first type. These, in turn, are adjoined by strip-shaped secondary regions 20c of the second type.

The flexible planar structure 20 having the regions 20a, 20b, 20c has a continuous knitted fabric structure, which can be produced in a single process. It is thus possible to configure the planar structure 20 with regionally varying characteristics, in particular with varying elasticity, without the individual regions having to be separately produced and subsequently joined for this purpose. The design as a cohesive knitted fabric composite results in a particularly good quality and an esthetically attractive appearance.

The sun screen 20 can be rolled up on a roller blind shaft 30, which is located at the rear end of the panoramic opening 12 above a rear bench seat of the vehicle. On that side of the sun screen 20 which is facing away from the roller blind shaft, a dimensionally stable end part 32 is provided, which extends approximately over the full width of the sun screen 20 and is fixedly connected thereto.

Over the secondary regions 20b, 20c, cover sections 40 are provided, in the representation of FIG. 1 only the left-sided cover section being represented, in cut form. The right cover section is blanked out for easier comprehension.

The cover sections 40 are vehicle-fixed and are provided below the panoramic screen (not represented) in the panoramic opening 12. They extend over the complete length of the panoramic opening 12. In the vehicle transverse direction, they extend from the outer margins of the panoramic opening 12 sufficiently far in the direction of the vehicle middle that they fully cover the secondary regions 20b, 20c, yet leave the main region 20a of the sun screen 20 largely uncovered.

The working method of the represented sun screen system is described below. Starting from a full stowage position, in which the sun screen 20 is fully rolled up on the roller blind shaft 30, the sun screen 20, via the dimensionally stable end part 32 at the front end of the sun screen 20, can be pulled forward in the vehicle longitudinal direction by manual or motorized means, whereupon the sun screen 20 is unrolled from the roller blind shaft 30. The sun screen 20 is here laterally guided in the marginal region of the secondary regions 20c of the second type. The cover sections 40 serve to ensure that, in the working state represented in FIG. 1, sunlight can always strike only the main region 20a of the sun screen 20, but not the light-permeable secondary regions 20b.

The secondary regions 20b of the first type and the main region 20a of the sun screen 20 differ in terms of their textile design. In the main region 20a, the knitted fabric is impermeable and non-elastic, while in the secondary regions 20b of the first type a more wide-meshed knitted fabric is used, which is elastically stretchable and ensures a high air permeability. The secondary regions 20c of the second type conform with respect to their textile design to the main region 20a. The embodiment of the planar structure as a knitted fabric enables the various regions to be differently formed in a particularly advantageous manner. Thus, in the secondary regions 20b of the first type, for example, loops can be omitted to reduce the stitch density. It is likewise possible to use in the secondary regions 20b an inherently elastic yarn. This design of the sun screen 20 with a variety of regions having different textile characteristics prevents the sun screen 20, even after years of use, from sagging in the middle, since, as a result of the elastic expandability of the secondary regions 20b of the first type, short-term stretching loads do not result in unwelcome plastic deformation of the sun screen 20. Moreover, the air permeability of the secondary regions 20b serves to ensure that an air exchange between the inner region of the vehicle and the environment is possible even at high speeds, so that the sun screen, in vehicles having an open panoramic opening, is not pushed into the vehicle or sucked out of the vehicle due to permanent pressure differences. The air permeability is ensured by the wide-meshed secondary regions 20b, as well as by a distance between the cover sections 40 and the sun screen 20. As a result of the secondary regions 20c of the second type, a secure guidance and fastening of the sun screen 20 in the marginal region is possible.

Figure 2:
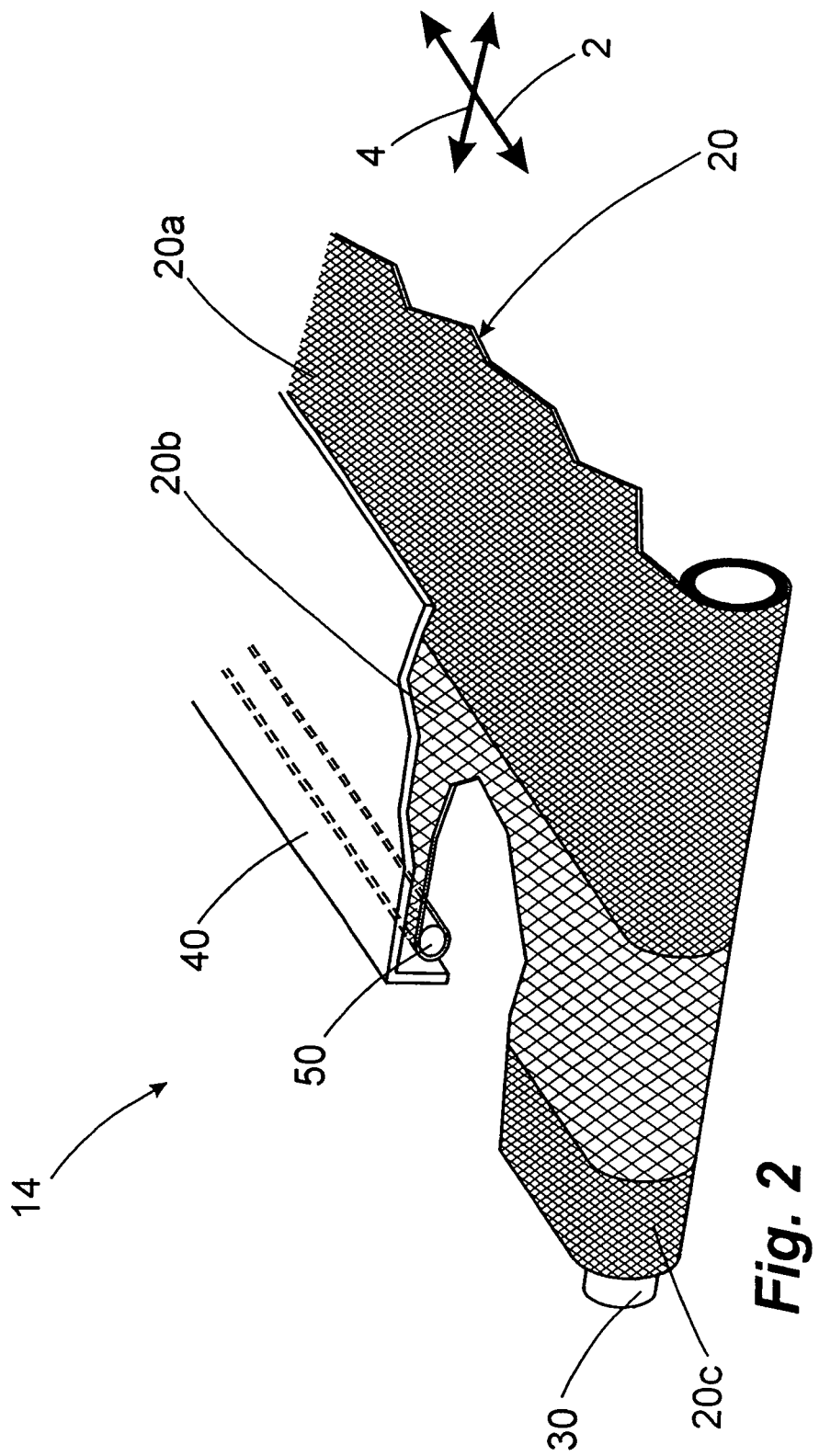
FIG. 2 shows a detailed representation of a section of the sun screen system represented in FIG. 1.

FIG. 2 shows a part of the sun screen system represented in FIG. 1, in an enlarged representation. This concerns a section of the symmetrically configured sun screen system 14 which is disposed in the left side in the rear region of the vehicle roof.

It can be seen that the sun screen 20 with its main region 20a and the one represented secondary region 20b of the first type, as well as the represented secondary region 20c, is partially rolled up on the roller blind shaft 30. When the sun screen 20 is unrolled from the roller blind shaft 30, the secondary region 20c of the second type, adjoining the secondary region 20b of the first type, is placed continuously around a guide element 50 in the form of a guide rod 50 and guided further forward along this guide rod 50. It can further be seen that the cover sections 40 fully span both the guide rod 50 and the secondary region 20b, 20c of the sun screen 20. In order to ensure an air exchange between the vehicle interior and the environment, a space is provided, however, between the surface of the secondary sections 20b and the cover section 40.

Figure 3:
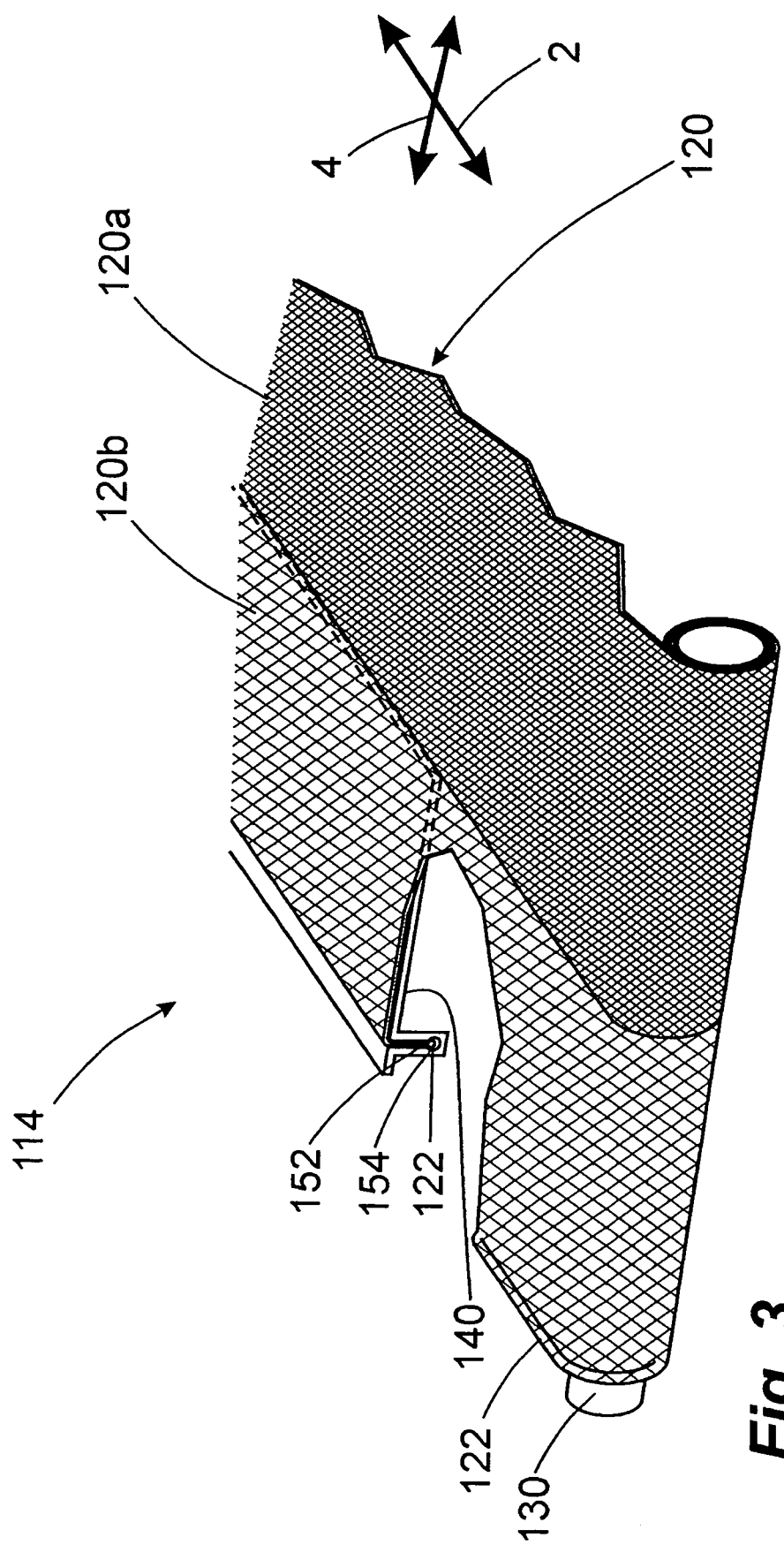
FIG. 3 shows a section of a second embodiment of a sun screen system according to the invention.

FIG. 3 shows an alternative embodiment of a sun screen system, only a detail of the left-sided rear region of the sun screen system 114 being represented, as in FIG. 2. Unlike the embodiment of FIG. 2, in this alternative embodiment the guide devices for guiding the sun screen 120 and the cover section 140 are configured as a single component. The design provides that a cover section 140 is adjoined on the outside by an upwardly open groove 152, which in its groove floor has a widening 154. Unlike the embodiment of FIGS. 1 and 2, the sun screen 120 is in turn configured as a unitary knitted fabric, yet, in addition to the main region 120a, has only secondary regions 120b of the first type, which thus also form the outer margin of the sun screen 20. In the region of these secondary regions 120b, a thickening 122 is respectively provided, which is dimensioned such that it can be introduced into the widening 154, yet does not fit through the upper section of the groove 152. When the sun screen 120 is unrolled from the roller blind shaft 130, the thickenings 122 on both sides of the sun screen 120 are introduced, in a manner not represented in detail, into the widening 154 of the groove 152 and the corresponding groove on the other side of the sun screen, so that the sun screen is securely guided on both sides.

Unlike the embodiment of FIGS. 1 and 2, the cover sections 140 are not provided above the secondary regions 120b, but lie beneath the secondary regions 120b. Furthermore, the secondary regions 120b of the sun screen 120 rest directly on the cover sections 140, so that an air exchange through the secondary regions 120b is not possible or calls for a special configuration of the cover sections 140.

The invention claimed is:

1. Protective screen system for a vehicle comprising:
    two guide devices running substantially parallelly in a pull-out direction;
    a protective screen guided on both sides on the guide devices and displaceable in the pull-out direction, wherein the protective screen is configured as a flexible planar structure constructed of a knitted fabric comprising at least one main region and at least one secondary region, the knitted fabric of the secondary region having a higher air permeability than the knitted fabric of the main region, and the main region and substantially all of the secondary region being coplanar with one another; and
    a rigid cover section extending along the flexible planar structure adjacent one of the guide devices and being disposed in superimposed and overlapping relation with the secondary region and leaving the main region substantially uncovered, the cover section being disposed a distance from the secondary region to define a space therebetween to provide air permeability.

2. Protective screen system according to claim 1, further comprising a roller blind shaft extending transversely to the pull-out direction for receiving the flexible planar structure in a partial or full stowage state.

3. Protective screen system according to claim 1, wherein the flexible planar structure includes two secondary regions located on respective opposite sides of the main region, and two rigid cover sections extend along the flexible planar structure adjacent the respective guide devices and are disposed in superimposed and overlapping relation with the respective secondary regions and leave the main region substantially uncovered, the cover sections each being disposed a distance from the respective secondary region to define a space therebetween to provide air permeability.

4. Protective screen system according to claim 3, wherein the cover sections are disposed above the respective secondary regions.

5. Protective screen system according to claim 3, wherein the cover sections are disposed below the respective secondary regions.

6. Protective screen system according to claim 1, wherein the cover section is disposed one of: above; and below the secondary region.

7. Protective screen system according to claim 1, wherein the distance is defined between the secondary region and the cover section in a direction substantially perpendicular to a plane in which the flexible planar structure is oriented.

8. Protective screen system according to claim 1, wherein the cover section is disposed in vertically-aligned and overlapping relationship with the secondary region.

9. A protective screen system for a vehicle for fastening in the region of a vehicle roof or a vehicle trunk compartment so as to be displaceable in a pull-out direction oriented substantially along a longitudinal axis of the vehicle, said screen system comprising:
    a pair of guide devices oriented in the pull-out direction and being disposed substantially parallel to one another and in spaced-apart relation with one another in a direction transverse to the pull-out direction;
    a protective screen having opposite sides supported on and guided by the respective said guide devices and being displaceable in the pull-out direction, said protective screen comprising a flexible structure comprising at least one main region and at least one secondary region, said main region and said secondary region each being constructed of a knitted fabric and said main region and substantially all of said secondary region being oriented in the same plane with one another, said knitted fabric of said secondary region being configured to have a higher air permeability than said knitted fabric of said main region; and
    a rigid cover section oriented in the pull-out direction adjacent one of said guide devices, said cover section being disposed in vertically-spaced relation from said secondary region to define a gap between said cover section and said secondary region to permit air flow therebetween, and said cover section extending in a direction transverse to the pull-out direction a sufficient distance so as to cover said secondary region.

10. The protective screen system of claim 9, wherein said cover section extends in a direction transverse to the pull-out direction so as to be disposed in vertically overlapping and covering relation with said secondary region.

11. The protective screen system of claim 9, further including a roller blind shaft extending transversely to the pull-out direction, said protective screen being mounted on said roller blind shaft such that said protective screen can be wound up on said roller blind shaft in a direction opposite to the pull-out direction into a storage configuration and unwound from said roller blind shaft in the pull-out direction into a use configuration.

12. The protective screen system of claim 9, wherein said flexible planar structure includes two said secondary regions disposed on respective opposite sides of said main region, and two said rigid cover sections extend along said flexible planar structure adjacent the respective said guide devices, each said cover section extending in a direction transverse to the pull-out direction a sufficient distance so as to cover the corresponding said secondary region, and each said cover section being disposed a vertical distance from the corresponding said secondary region so as to define a gap therebetween to provide air permeability.

13. The protective screen system of claim 12, wherein said cover sections are disposed one of: above; and below the corresponding said secondary region, and said cover sections are in vertically-aligned relation with the corresponding said secondary regions.

14. The protective screen system of claim 9, wherein said main region and said secondary region are constructed of a continuous and cohesive knitted fabric composite which extends continuously and in an uninterrupted manner between the respective guide devices.

15. The protective screen system of claim 9, wherein said main region and said secondary region are constructed of a continuous and cohesive knitted fabric composite, said knitted fabric of said secondary region having a stitch density which permits air flow through said secondary region, the stitch density of said knitted fabric of said secondary region being lower than a stitch density of said knitted fabric of said main region.

16. The protective screen system of claim 9, wherein said main region and said secondary region are constructed of an integral knitted fabric, and said knitted fabric of said secondary region has a stitch density which permits air flow through said secondary region while said knitted fabric of said main region has a stitch density which does not permit air flow through said main region.

17. The protective screen system of claim 9, wherein said main region and said secondary region are constructed of a continuous and cohesive knitted fabric composite, said knitted fabric of said secondary region being air permeable and elastic and said knitted fabric of said main region being air impermeable and non-elastic.

18. The protective screen system of claim 9, wherein said main region and said secondary region are constructed of a continuous and cohesive knitted fabric composite, and said knitted fabric of said secondary region is constructed of a yarn type different from a yarn type of said main region.

19. The protective screen system of claim 18, wherein said knitted fabric of said secondary region has a lower stitch density than a stitch density of said knitted fabric of said main region.

20. Protective screen system according to claim 1, wherein the flexible planar structure extends continuously and in an uninterrupted manner between the respective guide devices.

21. Protective screen system according to claim 1, wherein the knitted fabric of the secondary region has a stitch density which permits air flow through the secondary region, the stitch density of the knitted fabric of the secondary region being lower than a stitch density of the knitted fabric of the main region.

22. Protective screen system according to claim 1, wherein the main region and the secondary region are constructed of a continuous and cohesive knitted fabric composite which extends continuously and in an uninterrupted manner between the respective guide devices.

23. Protective screen system according to claim 1, wherein the main region and the secondary region are constructed of an integral knitted fabric, and the knitted fabric of the secondary region has a stitch density which permits air flow through the secondary region while the knitted fabric of the main region has a stitch density which does not permit air flow through the main region.

* * * * *